Aug. 20, 1935.  F. A. HANSEN ET AL  2,012,165

HEAT TREATING IN CIRCULATORY GASES

Filed Oct. 5, 1931

Inventors:
Harold E. Koch,
Fred A. Hansen,
By Wilkinson Huxley Byron & Knight,
Attys.

Patented Aug. 20, 1935

2,012,165

UNITED STATES PATENT OFFICE

2,012,165

HEAT TREATING IN CIRCULATORY GASES

Fred A. Hansen and Harold E. Koch, Shorewood Village, Wauwatosa, Wis., assignors to Hevi Duty Electric Company, Milwaukee, Wis., a corporation of Wisconsin Application October 5, 1931, Serial No. 567,085

3 Claims. (Cl. 148—16)

This invention relates to a new and improved method of treating articles or substances under predetermined and controlled conditions of atmosphere and temperature.

This invention has particular usefulness in treating substances, such as metals, in the well known process of annealing ferrous or non-ferrous metals, and annealing, nitriding or carburizing ferrous metals, but is also applicable to various other thermo-chemical treatments where atmospheric and temperature conditions are vital.

This invention is characterized by the provision of an isolated treating atmosphere of any desired gas or vapor existing under predetermined constant or changing conditions of temperature and pressure and the further provision for forced circulation of said atmosphere during the treatment period, controlled and regulated both as to path of flow and velocity, and with provision for replenishment and escapement of said isolated atmosphere.

This invention is further characterized by the establishment and maintenance of the desired atmospheric conditions throughout the entire treatment period, which may be either constant and unchanging, or variable through any predetermined cycle depending upon the results desired for the particular treatment practiced, and the provision for controlled variation in temperature throughout any desired heating and cooling cycle.

This application embodies in part the disclosure of the former application which was copending herewith Serial No. 504,586, filed on December 24th, 1930 by Harold E. Koch and Melville Lowe, for improvements in heat treating in circulatory gases.

The process of this invention utilizes the joint results secured by a controlled forced and directed circulation of the treating atmosphere, whereby first, uniformity of treatment results from uniform distribution of the treating atmosphere and temperature, and secondly, with certain treating atmospheres, chemical disassociation is produced under the combined action of molecular motion due to heat, and bodily movement of the atmospheric gases under the action of forced controlled circulation and pressure.

Obviously, this process may be employed for various treatments of a number of different substances as the principles involved are broad and serve with equal utility and advantage in numerous thermo-chemical reactions.

For the purposes of illustration, however, the process will be described as applied to the treatment of metals and from the following disclosure, it will readily appear that the process makes for great utility and advantage in treatments such as annealing, reducing, carburizing and nitriding of steel, or annealing either ferrous or non-ferrous metals.

It will also appear that various atmospheric mediums may be employed depending upon the treatment practiced, and likewise the prevailing atmospheric conditions which are established whether they be constant or variable through a predetermined cycle, will be selected according to the particular reaction or treatment desired.

When carburizing steel, a carbon bearing atmosphere is established before the temperature is sufficiently high to produce oxidation, by displacing all air or oxygen from the region of the enclosed or isolated atmosphere whereby all danger of oxidation of the steel being treated is avoided when the higher treating temperatures are reached.

In establishing the desired carbon bearing atmosphere, the utilization of temperature, pressure and especially the controlled velocity become important, because a proper selection and control of these factors enables the production of a carbon bearing atmosphere from various relatively cheap substances such as hydrocarbon liquids or gases.

It is well known that hydrocarbon fluids may be treated under prescribed conditions of temperature and pressure to cause the hydrocarbon constituents to become broken up or cracked, which cracking results in part in the production of free carbon. This method of providing carbon bearing atmospheres is old and well known and has been used for carburizing steel, but in processes practiced heretofore, no forced and directed circulation of the carbon atmosphere has been established to produce the superior results as to quality of the processed articles and economy in operation obtained by this invention.

It is the discovery of this invention, that improved results as to quality of the processed articles, and economy in operation, can be produced in carburizing steel by utilizing an accelerated and directed motion of the carbon bearing atmosphere, in a controlled and regulated manner under predetermined temperature conditions of the atmosphere and the steel being treated, both during the cracking and the carburizing processes. Such improved results are products of a maximum cracking action by the increased collision effect between the hydrocarbon constituents, due to the molecular vibration of heat, combined with the preferred high velocity physical collision thereof caused by the controlled forced circulation through the tortuous interrupted spaces created by the articles being treated. Perforated baffles, placed in selected positions within the charge are sometimes used to increase the collision or impact effects. For example, in a charge of comparatively medium and small sized set screws no baffles are necessary, there being sufficient interstices for the confused flow to cause violent impacts with the circulating gases. But, with a charge of larger articles such as wrist-pins, it has been found preferable to use baffle plates.

The applicants have discovered that the superior results when carburizing are produced when the hydrocarbon fluid is partially cracked in a substantially unobstructed passageway for the flow of the fluid, separated from the articles being treated, and then subsequently, further cracking the constituents by repeated violent contacts with said articles. The superior effects of such violent circulation or confused movement of gases are felt the moment the hydrocarbon gas is moved into contact with the articles being treated.

The gas may be constantly replenished by means hereinafter explained, to maintain or change the character as to density of the atmosphere. For example, by careful regulation of inflow of a carbon bearing fluid, the quantity of gaseous carbon may substantially balance that absorbed by the steel, thus leaving a comparatively small amount of free carbon.

Articles to be treated do not require any special placement in the container provided for the charge, as the violently agitated but obstructed flow of gases and conveyed heat seek every portion of the surfaces comprising the articles of the charge,—not possible where articles are packed in granular carburizers, nor when the articles are surrounded by carburizing gases comparatively motionless.

Still another result of this invention is the clean surface of the articles during and after carburizing. The violent agitation resulting from preferred high velocity in the circulation of the gases has an abrasive effect, which prevents to a substantial extent the settling of free carbon on the articles. A deposit of free carbon prevents proper absorption of carbon from the gaseous atmosphere into the surface of the steel articles of the charge; and, since the gaseous atmosphere is constantly refreshed, the cleaned surface of the steel articles more readily and uniformly absorb the carbon from the gas.

As an example, it is shown in the 1930 hand book of the American Society of Steel Treating, page 110, that certain penetration or case depth is obtained in a certain number of hours. In the following table, the column headed "Hand book" shows the number of hours for penetrations. In the column headed "This invention", the time in hours is shown for equal penetration by the process of this invention.

| Penetration in inches | | Temperature, °F. | Time in hours | |
|---|---|---|---|---|
| Fractions | Decimals | | Hand book | This invention |
| 1/64 | .0156 | 1700 | 2.75 | .7 |
| 1/32 | .0312 | 1700 | 5 | 1.7 |
| 3/64 | .0469 | 1700 | 6.5 | 3.4 |
| 1/16 | .0625 | 1700 | 8 | 5.6 |
| 1/64 | .0156 | 1750 | 2 | .5 |
| 1/32 | .0312 | 1750 | 4 | 1.3 |
| 3/64 | .0469 | 1750 | 5 | 2.8 |
| 1/16 | .0625 | 1750 | 6 | 4.4 |
| 1/64 | .0156 | 1800 | 1.5 | .2 |
| 1/32 | .0312 | 1800 | 3 | 1.0 |
| 3/64 | .0469 | 1800 | 4 | 2.3 |
| 1/16 | .0625 | 1800 | 5 | 3.8 |

The total time for one heat each as shown in the hand book column is 52.75 hours. Corresponding figure for the process of this invention is 27.7 hours. The older method of the pack process as shown in the "Hand book" column is greater than ninety per cent (90%) more than the time of this invention. It is apparent that a process requiring ninety per cent (90%) more time causes a ninety per cent (90%) greater radiation or heat loss compared to the process of this invention. And, as is well known by those versed in the art of steel treating,—an excessive grain growth results from prolonged heating. The steel processed by the method of this invention therefore has a finer grain structure in the finished product. It is not uncommon to have steel carburized by the process of this invention to show one hundred points higher reading in the Vickers-Brinell hardness test, than steels otherwise processed.

Still another result obtained by the invention is the control as to depth of penetration. Recurring heats of like articles in the charge can be controlled, as to case depth, within one or two thousandths inch (.001 or .002″) of the desired depth. Furthermore, the maximum carbon content when carburizing may be at the surface of the steel articles and taper as to carbon content toward the core where only the initial carbon content of the steel remains; or, by discontinuing the introduction of the hydrocarbon fluid, the carbon content in the case may be diffused.

Since it has been shown that penetration of carbon in the steel is produced in a shorter period of time, with very slight deposit of free carbon, it is to be noted, that a conservation of the hydrocarbon is thereby effected, and a further economy realized. It may be noted further that a more uniform distribution of heat is effected by the rapid circulation of the gases which absorbs the heat from the retort and quickly transfers it to the articles of the charge.

In thermo-chemical reactions, steam may be injected into the isolated atmosphere where the charge therein may be charcoal. Under these conditions, the components of steam become disassociated and combine with the carbon atmosphere created by the heating of the charcoal whereby a hydrocarbon gas is formed.

Furthermore, by the introduction of steam and then heating to a certain temperature, with the charge consisting of steel articles, to be made oxide or rust-proof, a more uniform result is produced because the steam is disassociated by the cracking effect hereinabove described and the forced and controlled circulation of the disassociated gases results in a more uniform deposit of iron oxide as a protective coating.

Here again, the disassociation and deposition is so controlled as to occur for the most part, only throughout the region occupied by the articles to be treated. It should be understood that the controlling action is such that the violent movement of the treating gas, coupled with the temperature of the gas and the articles treated, produces the major portion of the cracking action at the time the treating gas is brought into impinging contact with the articles of the charge so that the disassociated gases which are desired for a thermo-chemical treatment, are more or less nascent in character and thus more reactive and are concentrated or localized throughout the region immediately surrounding the articles.

If it is desired, one or more catalyzers may be inserted within the isolated atmosphere, whereby the gas mixture may be modified in accordance with certain chemical reactions produced by the particular catalyzers employed.

By the process of this invention, bright annealing of non-ferrous metals, such as copper in a steam atmosphere, has been successfully performed with more uniform results and in a shorter period of time. Likewise the bright annealing of steel by the injection of hydrogen or inert gases into the circulatory system, or operations such as tempering or drawing of steel, have been performed with more uniform results and in a shorter period of time.

This invention is applicable to many different processes, some of which are briefly described as follows:

*Nitriding.*—Subjecting metallic substances such as steel, malleable iron, "Stellite", etc., to ammonia gases at approximately 950° F. to harden the surface to any required depth below the surface.

*Bower-Barf process.*—Subjecting steel to a steam atmosphere under pressure, and at a temperature of approximately 1450° F. to impart a rust-proof finish.

*Carburizing.*—Subjecting comparatively low carbon steel to temperatures of 1650 to 1725° F. in a carbon gas atmosphere, to impart a carbon case thereon. In this process, any carburizing compounds, such as hydrocarbon oils or hydrocarbon gases, bone ash, charcoal, coal, etc., may be used as a carburizing agent or carburizer. Bone ash, charcoal, coal, etc., are usually used in a powdered or granulated form.

*Processing.*—In these processes, steam, gases, or liquids (such as compounds of hydrocarbon oil) may be referred to as "processing fluids".

*Annealing non-ferrous metals.*—Copper in a steam atmosphere will anneal at temperatures of from 600 to 1200° F. according to the time cycle at such temperatures.

*Annealing or normalizing steel.*—This can be done by a bright finish process by introducing an inert gas as the atmosphere surrounding the articles being treated.

*Drawing and tempering steel.*—In temperatures varying from approximately 400 to 1200° F. At a temperature above 950° F. the atmosphere may be hydrogen to prevent scaling.

Although the process of the present invention may be practiced with the assistance of any suitable apparatus, it is found that the apparatus set forth in co-pending application Serial No. 504,597, filed December 24th, 1930, by Fred A. Hansen for "Improvements in vertical retort furnace" serves especially well.

Accordingly, in order to assist in the understanding of this invention, the structure and operation of said furnace will be hereinafter described with reference to the accompanying drawing in which—

Figure 1:
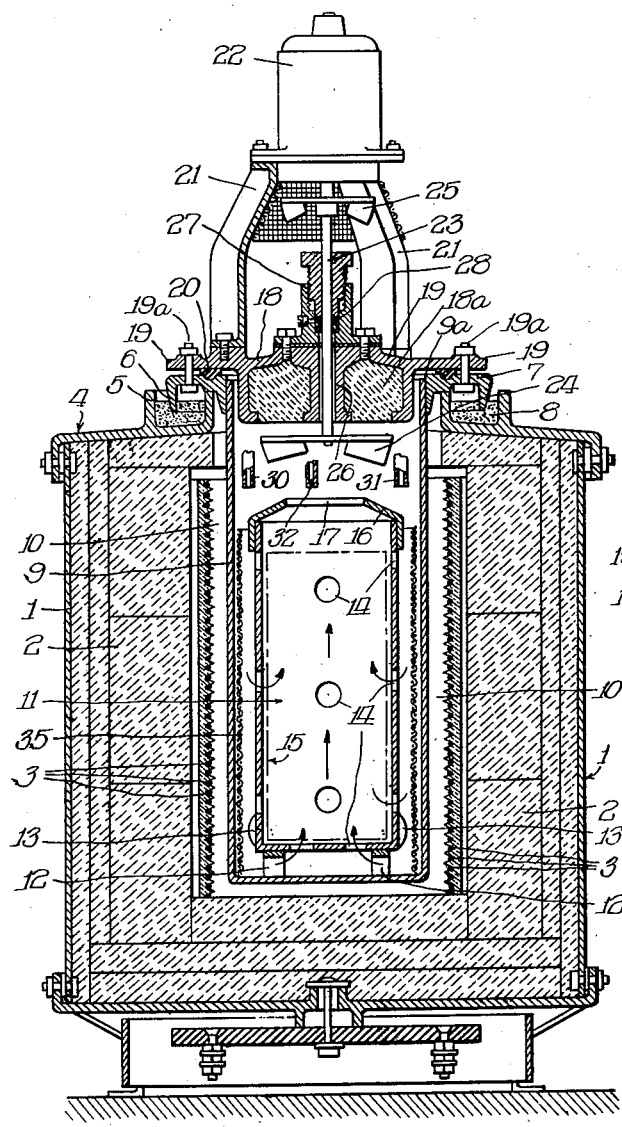
Figure 1 is a cross sectional view of said furnace with indications thereon of the gas circulation and control features whereby the process of this invention may be practiced.

Referring to the drawing in detail, reference character 1 designates the furnace casing which is lined with heat insulation material 2 providing a furnace chamber 10 which is lined interiorly with electric heating elements indicated at 3. While the chamber is shown heated electrically, it may be understood that the furnace can be heated by fuel and be effective in the processes described. The electric heating elements employed along the interior walls of the furnace chamber are of the construction shown more clearly in Letters Patent No. 1,768,865 to Edwin L. Smalley, dated July 1, 1930. The upper portion of the casing is closed by a top plate 4, in combination with a retort 9, the top plate 4 having a trough 5 therein into which the downwardly extending flange 6 of the rim plate 7 extends for establishing a seal for chamber 10 by means of sand indicated at 8. The rim plate 7 is sealed, as by welding to the upper extremity of the retort 9 indicated at 9a, the retort 9 depending downwardly into the furnace chamber 10. A container 11 is mounted within the retort 9 and is spaced from the interior walls thereof by means of lugs 13 to allow the free circulation of gases therearound. The container 11 is elevated from the bottom of the retort 9 by suitable brackets shown at 12. The container 11 is apertured around the side walls thereof and in the bottom thereof as indicated at 14. The container 11 encloses the charge indicated at 15. A top deflector 16 is mounted upon the container 11, the closure being frustro-conical in shape and being centrally apertured as designated at 17. Perforated baffle plates 15a sometimes used in charges of comparatively large articles are shown as positioned in Figure 2.

The retort is closed by a heat insulated cover member indicated at 18. The cover member projects downwardly into the retort and has a laterally projecting flange 19 which is secured to rim plate 7 by means of bolt members 19a. A gasket 20 provides a gas tight seal between the cover member 18 and the rim plate 7 so that the retort is thereby sealed with respect to its cover. The cover member 18 is filled with heat insulation material indicated at 18a. A tripod support consisting of frame members 21 is mounted on the cover member 18 and carries the driving motor 22. The rotatable shaft 23 extends from motor 22 and projects through cover member 18 into the retort 9. A fan 24 is carried by the end of the shaft within the retort and serves to centrifugally circulate gases within the retort. A fan 25 carried by shaft 23 is located outside of the retort 9 and above the cover member 18 and serves to establish a forced draft for cooling the motor and shaft 23. That the shaft 23 is maintained in a lubricated condition during a carburizing process, may be understood by observing the arrangement of the journal 26 in the cover member 18 having stuffing box 27 in the upper portion thereof. The packing 28 is continuously saturated by the deposit of carbon particles liberated in the carburizing process which particles are forced upwardly along a shaft 23 into the packing 28. The shaft is not only thereby lubricated but leakage which might otherwise result is prevented by the cumulative collection of carbon deposits in the packing.

Inlet and outlet pipes are provided represented at 30 and 31 respectively, the pipes projecting through the cover member 18 constituting the top of the retort, horizontally beyond the perimeter of the fan 24 and provide means for introducing hydrocarbon oils, hydrocarbon gases, or any processing fluid, into the retort and into the circulatory system during the heat treatment process for establishing the required gas mixture; and also for introducing oil or other fluids during the cooling cycle subsequent to the heat treatment cycle. Inlet pipe 30 is preferably provided with a control valve 30a and is intended to be connected with any desired source of supply of the processing fluid and in certain instances may connect directly with an oil drip cup (not shown) mounted on the inlet pipe. Pipe 31 serves as a discharge pipe for venting the retort. It is to be noted that the introduction of any processing fluid at room temperature into a highly heated temperature results in expansion of the resulting gases, and that therefore by changing the amount of opening through the valve 31a controlling the exhaust vent, the flow of gases may be controlled. In practice, the exhaust vent is always open, in order to prevent development of excessive pressures or encountering the danger of explosions. When workable pressures are desired in the retort, this may be accomplished by cutting down the outward passage of gases below the rate at which the fresh gas is introduced or generated. To insure against the tight closing of the exhaust valve 31a, the seat of the valve may be notched, if desired, so that some venting at this point always exists. In order to determine the temperature within the retort, a pipe 32 is provided, with closed bottom into which a thermo-couple may be positioned.

Between the inner wall of retort 9 and the container 11, one or more catalyzers are provided indicated at 35 in the path of the circulatory gases. It is therefore possible to modify the gas mixture by means of the catalyzer in the circulatory system. The processing fluids are preferably injected into the discharge of the centrifugal fan, causing atomization and a forced circulation in contact with the sides of retort 9, which being heated, readily but only partially cracks the processing fluid. As this fluid passes downwardly in an unobstructed passageway, between the walls of the retort 9, and the container 11, it is quickly heated to a temperature which conditions it for further cracking or disassociation.

Under the action of the forced circulation, the heated fluid is given a high momentum in the downward direction, approaching the lower regions of the retort where it will be forced to make a rapid reverse turn and enter the openings through the walls of the container 11. The inflow of gases into the container is assisted materially by the suction effect of the centrifugal fan. Immediately after the inflow of such gases they come in violent impinging contact with the irregularly positioned articles within the container. As a result of this treatment, the fluid becomes disassociated into two or more component parts of gaseous form throughout that portion of its travel when it passes through the region occupied by the articles being treated. Such gases being in the directed flow from the centrifugal force of the fan, are immediately available for intimate contact with every part of the charge, thus insuring a uniform treatment by the combination of heat and the processing fluid.

After the charge has been heat treated for the required time period, the retort is removed from the furnace chamber while maintaining the seal between the cover member 18 and the retort 9, and maintaining forced circulation in the retort, if desired. In a carburizing process using hydrocarbon oil, it is of value to continue the dripping of oil in very small quantities during the cooling process. The oil thus induced and expanded into gases obviates the necessity of letting in air to prevent the collapse of the retort by vacuum resulting from chilling. And if air were allowed during the cooling process it would result in an oxidation of the charge. Furthermore, the oil induced in the cooling cycle continues to be a carburizing means down to about 1400° F. It has been discovered, too, that the case produced in such a process, instead of having a marked line of demarkation between the case and the core, gradually changes to the core condition without having reduced the depth or effectiveness of the case, thereby improving the quality by reducing the otherwise tendency to brittleness.

Figure 2:
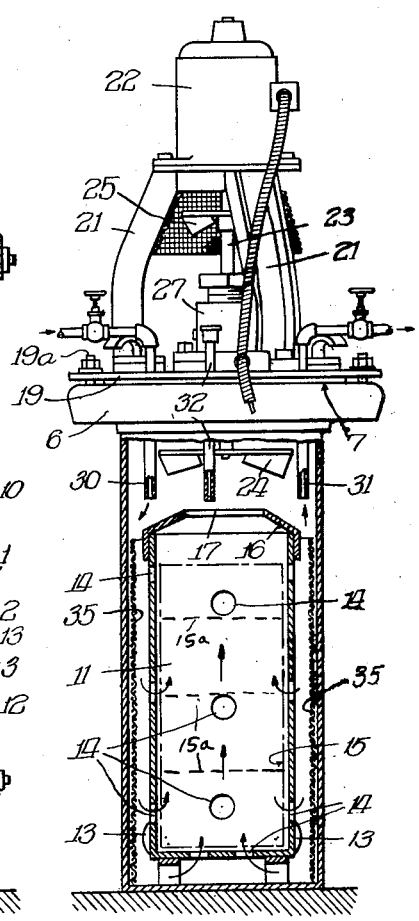
Figure 2 is a cross sectional view of the retort of said furnace showing its removability for purposes of cooling the treating atmosphere and articles contained therein.

Figure 2 shows the retort with cover and driving motor thereon detached from the furnace, as when utilized for rapid cooling. Regardless of the fact that the retort has been detached from the heat treatment chamber, the circulatory system may continue to operate thereby enabling the charge to be cooled under uniform conditions producing a uniform product of high quality, as a uniform cooling produces a grain structure common to the entire charge.

It will appear from the above description, that the temperature control may be effected by varying the intensity of the heating elements in the furnace or when cooling within the furnace is desired, the complete shutting down of the heating elements.

However, in practice, it is found desirable with a furnace of the above described type, to utilize a plurality of retorts with a single furnace whereby the retorts and their included isolated atmospheres may be bodily removed from heat transferring association with the furnace to a location where it may be surrounded by a cooling atmosphere. The furnace construction permits this to be done without disturbing the internal atmosphere and while maintaining the condition of the isolated atmosphere to complete the required treating cycle through the cooling period.

It is therefore contemplated that this invention shall include the process of removing the retort and its included isolated atmosphere from heat transferring association with the furnace and permitting the furnace to be used with a freshly charged retort for a new and independent treating reaction.

It is found that heat processing in circulatory gases of this invention is highly practical and while the process of this invention is described in its preferred embodiment, it is desired that it be understood that modifications may be made and that no limitations upon this invention are intended other than are imposed by the scope of the appended claims.

We claim:—

1. The process which comprises, first, preparing a processing gas, for ferrous articles, containing at least one of the substances of the group consisting of carbon and nitrogen derived by dissociation, by mixing in a retort cracked gas and a newly introduced uncracked gas, heating said mixture from a source exteriorly of said retort while imparting thereto an unobstructed movement at relatively high velocity until partial cracking of said uncracked gas occurs, then, secondly, suddenly bringing said gas mixture into a state of violent agitation and collision in intimate contact with heated ferrous articles enclosed in said retort and thereby further cracking said gas directly on and within the region of said articles, and while continuously recirculating a portion of the cracked gas from the region of said articles for mixture with said newly introduced uncracked gas and while withdrawing the remaining portion of said gas from said retort.

2. The process of carburizing ferrous articles which comprises, first, preparing a hydrocarbon gas derived by dissociation, by mixing in a retort, cracked hydrocarbon gas and newly introduced uncracked hydrocarbon gas, heating said mixture from a source externally of said retort while imparting thereto an unobstructed movement at relatively high velocity until partial cracking of said uncracked gas occurs, then, secondly, suddenly bringing said hydro-carbon gas mixture into a state of violent agitation and collision in intimate contact with heated ferrous articles enclosed in said retort and thereby further cracking said gas directly on and within the region of said articles and while continuously recirculating a portion of the cracked gas from the region of said articles for mixture with said newly introduced uncracked gas and while withdrawing the remaining portion of said gas from said retort.

3. The process of nitriding ferrous articles which comprises, first, preparing a processing gas containing nitrogen derived by dissociation, by mixing in a retort, cracked gas and a newly introduced uncracked gas, heating said mixture from a source exteriorly of said retort while imparting thereto an unobstructed movement at relatively high velocity until partial cracking of said uncracked gas occurs, then, secondly, suddenly bringing said gas mixture into a state of violent agitation and collision in intimate contact with heated ferrous articles enclosed in said retort and thereby further cracking said gas directly on and within the region of said articles, and while continuously recirculating a portion of the cracked gas from the region of said articles for mixture with said newly introduced uncracked gas and while withdrawing the remaining portion of said gas from said retort.

FRED A. HANSEN.
HAROLD E. KOCH.